United States Patent
Campton et al.

(10) Patent No.: US 10,280,989 B2
(45) Date of Patent: May 7, 2019

(54) TWIN HYDRAULIC PISTON FOR A SELECTABLE CLUTCH MODULE

(71) Applicant: BorgWarner Inc., Auburn Hills, MI (US)

(72) Inventors: Calahan B. Campton, Royal Oak, MI (US); Christopher A. Spangler, Rochester Hills, MI (US); Brett Peglowski, Oakland, MI (US)

(73) Assignee: BorgWarner Inc., Auburn Hills, MI (US)

( * ) Notice: Subject to any disclaimer, the term of this patent is extended or adjusted under 35 U.S.C. 154(b) by 6 days.

(21) Appl. No.: 15/443,517

(22) Filed: Feb. 27, 2017

(65) Prior Publication Data

US 2017/0254375 A1  Sep. 7, 2017

Related U.S. Application Data

(60) Provisional application No. 62/302,001, filed on Mar. 1, 2016.

(51) Int. Cl.
| | |
|---|---|
| *F16D 41/16* | (2006.01) |
| *F16D 23/12* | (2006.01) |
| *F16D 25/08* | (2006.01) |
| *F16D 25/00* | (2006.01) |

(52) U.S. Cl.
CPC ............. *F16D 41/16* (2013.01); *F16D 23/12* (2013.01); *F16D 25/00* (2013.01); *F16D 25/088* (2013.01); *F16D 2023/123* (2013.01)

(58) Field of Classification Search
CPC combination set(s) only.
See application file for complete search history.

(56) References Cited

U.S. PATENT DOCUMENTS

| | | | |
|---|---|---|---|
| 6,684,995 B1* | 2/2004 | Page | F16D 25/0638 192/106 F |
| 7,293,637 B2* | 11/2007 | Janson | B60K 6/48 180/65.25 |
| 8,376,108 B2* | 2/2013 | Fujita | F16D 25/0638 192/113.35 |
| 2003/0111314 A1* | 6/2003 | Moorman | F16D 25/0638 192/85.25 |
| 2008/0000747 A1* | 1/2008 | Saka | F16D 41/125 192/43.2 |
| 2010/0072019 A1* | 3/2010 | Ogasawara | F16D 21/06 192/48.611 |
| 2016/0238086 A1* | 8/2016 | Webert | F16D 48/00 |

* cited by examiner

*Primary Examiner* — Robert W Hodge
*Assistant Examiner* — Ryan P Dodd
(74) *Attorney, Agent, or Firm* — Miller, Matthias & Hull LLP (57) ABSTRACT

The selectable clutch may include a first actuator and a second actuator. Moreover, the selectable clutch may further include a first cam operatively associated with the first actuator and a second cam operatively associated with the second actuator. Furthermore, a first armature may be actuated by the first actuator and a second armature may be actuated by the second actuator such that the selectable clutch is configured to allow multiple modes of operation provided by a movement of the first and second cams according to different first and second armature positions.

15 Claims, 9 Drawing Sheets

TWIN HYDRAULIC PISTON FOR A SELECTABLE CLUTCH MODULE

CROSS-REFERENCE TO RELATED APPLICATION

This application is a non-provisional U.S. Application claiming priority under 35 U.S.C. § 119(e) to U.S. Provisional Patent Application Ser. No. 62/302,001, filed on Mar. 1, 2016.

FIELD OF THE DISCLOSURE

The present disclosure is generally related to clutches for automotive transmissions, and more particularly, relates to selectable clutch assemblies employed in the operation of such transmissions.

BACKGROUND OF THE DISCLOSURE

Some machines such as, automobiles, trucks, vans, agriculture equipment, construction equipment, or the like, may be equipped with a multi-mode clutch actuation device. Moreover, such machines may include an internal combustion engine containing a rotatable crankshaft configured to transfer power from the engine through a driveshaft in order to propel the machine. Furthermore, a transmission may be positioned between the internal combustion engine and the driveshaft to selectively control torque and speed ratios between the crankshaft and driveshaft.

In the case of a manually operated transmission, a manually operated clutch may be positioned between the internal combustion engine and the transmission to selectively engage and disengage the crankshaft from the driveshaft in order to facilitate shifting through the available transmission gear ratios. Alternatively, in an automatically operated transmission, a plurality of automatically actuated clutch units may be adapted to dynamically shift through the available gear ratios without requiring operator intervention. In some embodiments, the plurality of clutch units or clutch modules may be incorporated within automatic transmissions to facilitate the automatic shifting through the gear ratios.

Moreover, the transmission may incorporate numerous sets of gears and the various gears may be structurally comprised of sun gears, intermediate gears, such as planet or pinion gears supported by carriers, and outer ring gears. Moreover, specific transmission clutches may be associated with specific sets of the selectable gears within the transmission to facilitate the desired ratio changes.

An exemplary automatic transmission clutch module that is associated with first (low) and reverse gear ratios may be positioned near the front of the transmission and closely adjacent to the engine crankshaft. The clutch may have a driving member and a driven member disposed circumferentially about the driving member. Furthermore, the driving and driven members may be configured to operate in multiple modes. In one non-limiting example, the driving member may be drivingly rotatable in only one direction. Alternatively or additionally, the driving member may be drivingly rotatable in a plurality of directions; however other modes and rotations may be possible. Moreover, the driving member may be selectively locked to the driven member via an engagement mechanism such as a roller, a sprag, a pawl or other known engagement mechanisms. The rotation of the driving member may be effective to directly transfer rotational motion from the engine to the driveline.

In some transmission systems, the driven member may be fixed to an internal case or housing of an associated planetary member of the automatic transmission. Under such circumstances, in a first configurational mode the driving member may need to be adapted to drive in one rotational direction, but freewheel in the opposite direction, in a condition referred to as overrunning. Those skilled in the art will appreciate that overrunning may be particularly desirable under certain operating states, such as when a machine is traveling downhill or coasting. Under such condition, the driven member may occasionally have a tendency to rotate faster than its associated driving member. Allowing the driving member to overrun the driven member may help provide protection against damage to the engine and/or transmission components.

In a second non-limiting mode, such as when a machine may be in reverse gear, the engagement mechanisms may be adapted for actively engaging in both rotational directions of the driving member, thus not allowing for an overrunning condition in either direction.

Automatic transmissions may include a plurality of gear sets to accommodate multiple gear ratios, and therefore the reliability of actuators used for automatically switching clutch modules between and/or among various available operating modes is a consistent design concern. As a result, much effort has been directed to finding ways to assure actuator reliability at competitive costs.

SUMMARY OF THE DISCLOSURE

In accordance with one aspect of the present disclosure a twin actuating mechanism for a selectable clutch having a plurality of operational modes is disclosed. The twin actuating mechanism may include a first actuator having a first actuator housing and the first actuator housing may define a first actuator chamber. A second actuator including a second actuator housing and the second actuator housing may define a second actuator chamber. The twin actuating mechanism may further include a first actuator piston disposed within the first actuator chamber, the first actuator piston slidably engaged with a first lateral sidewall and a second lateral sidewall of the first actuator housing such that the first actuator piston is configured to move along the first and second lateral sidewalls between at least a first actuator piston first position and a first actuator piston second position. Moreover, a second actuator piston may be disposed within the second actuator chamber, and the second actuator piston may be slidably engaged with a first lateral sidewall and a second lateral sidewall of the second actuator housing such that the second actuator piston is configured to move along the first and second lateral sidewall between at least a second actuator piston first position and a second actuator piston second position. Furthermore, a first actuator spring may be operably coupled with the first actuator piston and the first actuator spring may be disposed between a first actuator housing first axial end and a first actuator piston first surface. A second actuator spring may be operably coupled with the second actuator piston and the second actuator spring may be disposed between a second actuator housing first axial end and a second actuator piston first surface. The twin actuating mechanism may further include a first armature fixedly attached the first actuator first surface such that the first armature is configured to respond to a movement of the first actuator piston and a second armature fixedly attached to the second actuator piston first surface such that the second armature is configured to respond to a movement of the second actuator piston. Furthermore, a first actuator housing opening may extend from a first actuator housing exterior surface into the first actuator chamber, the first actuator housing opening may be positioned adjacent to a first actuator housing second axial end, and the first actuator housing opening may be configured to fluidly connect a pressure source with the first actuator chamber. Likewise, a second actuator housing opening may extend from a second actuator housing exterior surface into the second actuator chamber, the second actuator housing opening may be positioned adjacent to a second actuator housing second axial end, and the second actuator housing opening may be configured to fluidly connect the pressure source with the second actuator chamber. A pressure may be selectively supplied by the pressure source to at least one of the first actuator opening and the second actuator opening, and the pressure may act upon at least one of the first actuator piston and the second actuator piston to actuate the selectable clutch between the plurality of operational modes.

In accordance with another aspect of the present disclosure a selectable clutch having a plurality of operational modes is disclosed. The selectable clutch may include a twin actuating mechanism configured to selectably actuate the selectable clutch between the plurality of operational modes. The twin actuating mechanism of the selectable clutch may include a first actuator and a second actuator fluidly coupled to a pressure source and the pressure source may be configured to selectably supply a pressure to actuate the first and second actuator. The selectable clutch may further include a first cam having a first cam profile and a second cam having a second cam profile, and the first and second cams may be actuated by the first and second actuators. Furthermore, a first cam arm may be attached to the first cam and a second cam arm may be attached to the second cam, wherein the first cam arm may be operatively associated with the first actuator and the second cam arm may be operatively associated with the second actuator. Additionally the selectable clutch may include at least one pair of opposing pawls, wherein the at least one pair of opposing pawls may be able to rotate according to the position of the first cam profile and the second cam profile. Moreover, the first and second actuators may be configured to selectively actuate the first and second cams to actuate the selectable clutch between the plurality of operational modes.

These and other aspects and features will be better understood when reading the following detailed description in conjunction with the accompanying drawings.

BRIEF DESCRIPTION OF THE DRAWINGS

For further understanding of the disclosed concepts and embodiments, reference may be made to the following detailed description, read in connection with the drawings, wherein like elements are numbered alike and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
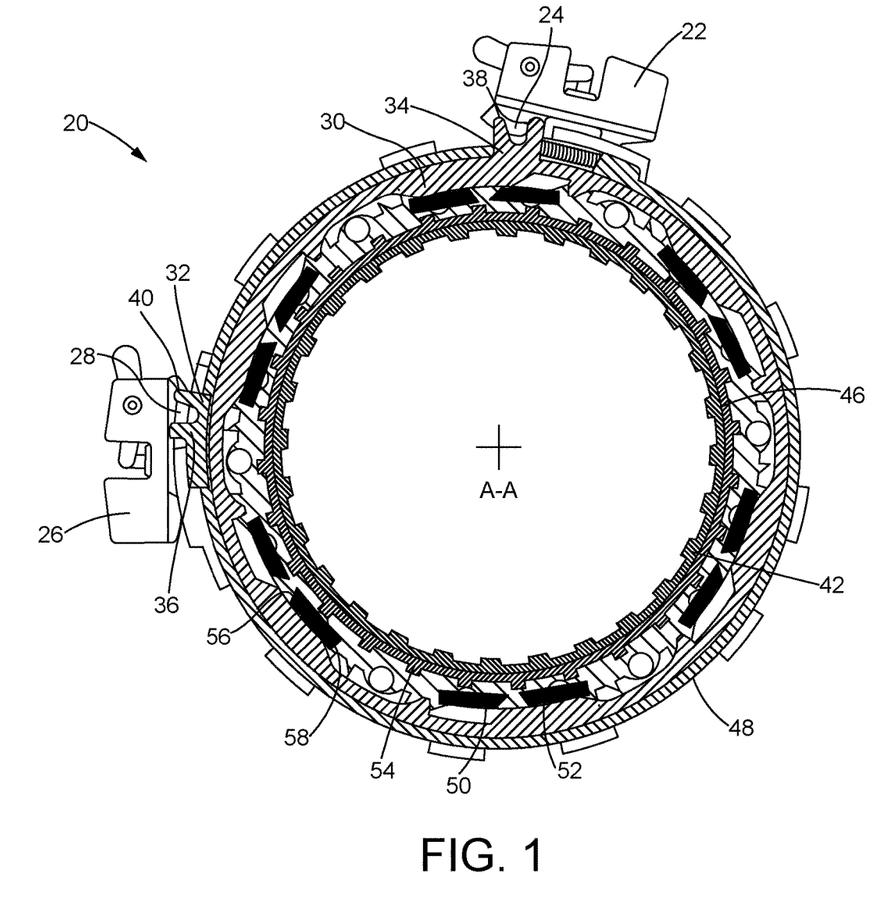
FIG. 1 is a side sectional view of a selectable clutch assembly constructed in accordance with the present disclosure.

Turning now to the drawings, and with specific reference to FIG. 1, a selectable clutch constructed in accordance with the present disclosure is generally referred to by reference numeral 20. One non-limiting example of the selectable clutch module 20 is illustrated as that of a multi-mode clutch. However it will be understood that the present disclosure may be applied to other types of selectable clutches. The selectable clutch module 20 is shown to include a first actuator 22 having a first armature 24 and a second actuator 26 having a second armature 28. The first and second actuators 22, 26 may be hydraulic actuators such as hydraulic over spring actuators, hydraulic over hydraulic actuators or other known types of actuators. Moreover, the first and second armatures 24, 28 may be moved upon actuation by the first and second actuators 22, 26, and such actuation of the first and second armatures 24, 28 may be utilized to control a plurality of modes of the selectable clutch module 20.

The selectable clutch module 20 may also include a first cam 30 and a second cam 32 and the first and second cams 30, 32 may be configured such that they are independent from one another. Moreover, the first and second cams 30, 32 may be substantially circular in shape and configured to independently move or rotate with respect to one another. In some embodiments, the first cam 30 may have a first cam arm 34 and the second cam 32 may have a second cam arm 36 Moreover, in one non-limiting example the first and second cam arms 34, 36 may be rigidly attached to the first and second cams 30, 32; however other attachment configurations may be possible. A first cam arm face 38 may be located on the first cam arm 34; a second cam arm face 40 may be located on the second cam arm 36. In some embodiments the first and second cam arm faces 38, 40 may be u-shaped and configured to mate with the first and second armatures 24, 28, however other shapes and configurations of the cam arm faces 38, 40 are possible. In one exemplary embodiment, actuation of the actuators 22, 26 may cause the first and second armatures 24, 28 to impinge upon the first and second cam arm faces 38, 40 upon the actuation of the actuators 22, 26. This impingement may cause the first and second cam arms 34, 36 to move. Accordingly, as the cam arms 34, 36 may be rigidly attached to the cams 30, 32; a motion of the cam arms 34, 36 may produce a corresponding motion or rotation of the respective cams 30, 32. In this manner, the cam arms 34, 36 and the cams 30, 32 may responsively move to the motion of the actuators 22, 26 and the armatures 24, 28.

The selectable clutch module 20 may also include a rotatable driven hub 42 and an outer housing (not shown). The driven hub 42 may be adapted to secure a rotatable driving member 46 or inner race. Moreover, the selectable clutch module 20 may have a driven member 48 or outer race that is positioned and configured as a non-rotatable member. During operation, the first and second cams 30, 32 may be disposed between the driving member 46 and the driven member 48 and configured to rotate over a predetermined angle about a common axis A-A of the driven hub 42. In some embodiments, the angular rotation of the cams 30, 32 may be utilized to control one or more movements of at least one pair of opposed pawls 50, 52. In one non-limiting example, the driving member 46 may include a series of notches 54. In operation, the opposed pairs of pawls 50, 52 may rotate or otherwise move between an open position, a locked position, and any other desired position. Moreover, the opposed pairs of pawls 50, 52 may be shaped or otherwise formed to have a toe portion 56 and a heel portion 58. In an open position, the opposed pairs of pawls 50, 52 may allow the driving member 46 to rotate in a particular direction, or both directions. Additionally, or alternatively, when placed in a locked position the opposed pairs of pawls 50, 52 may restrict rotation of the driving member 46 in a particular direction due to interference between one of the pawls 50, 52 and the notches 54. In some embodiments the locked position may also be referred to as a ratcheting position. More specifically, in the locked position the toe portion 56 of the pawls 50, 52 may interfere with a notch 54 of the driving member 46, thus preventing the driving member 46 rotating in a particular direction.

Figure 2:
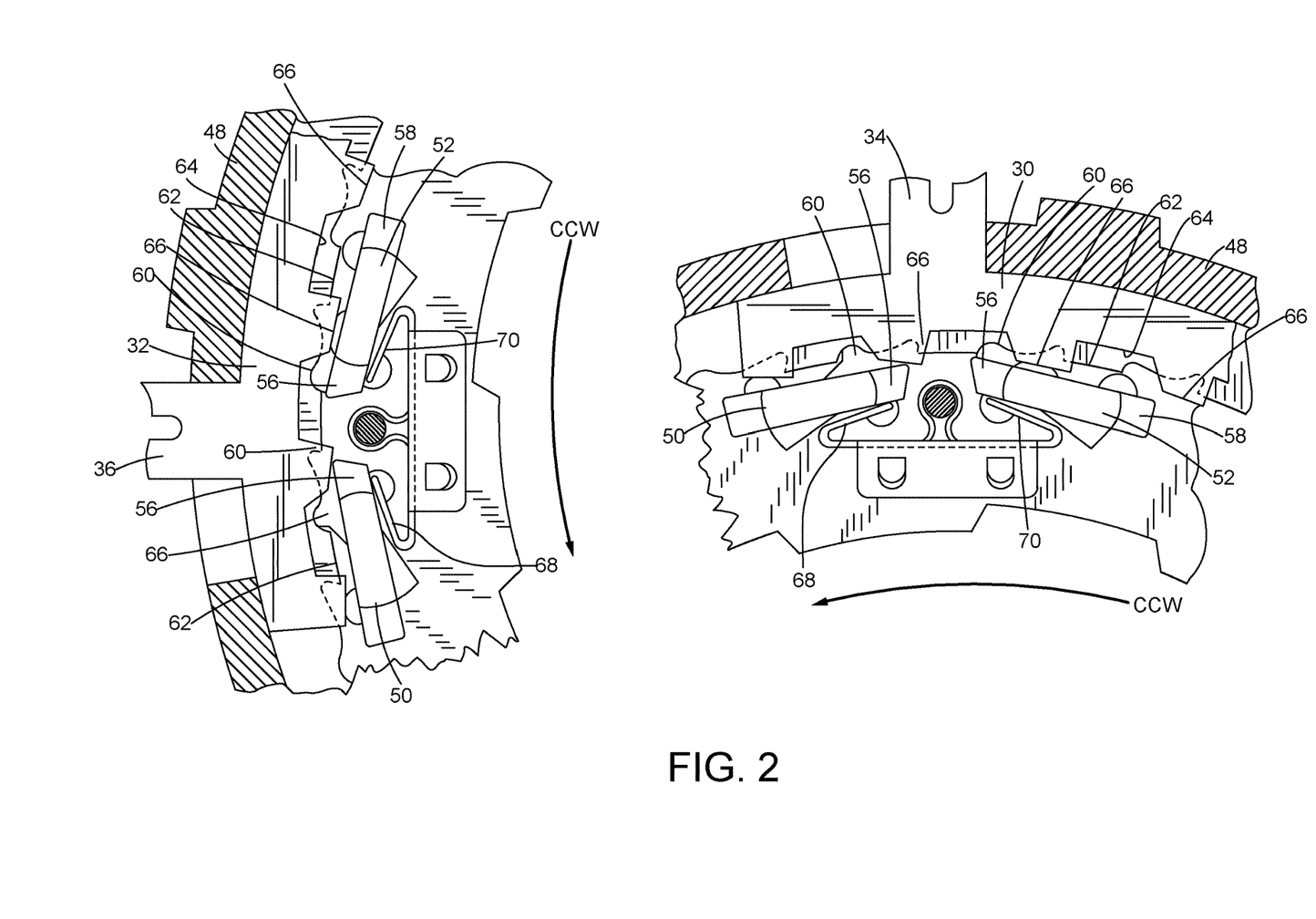
FIG. 2 is an enlarged side sectional view of a portion of the selectable clutch assembly of FIG. 1 constructed in accordance with the present disclosure.
Figure 3:
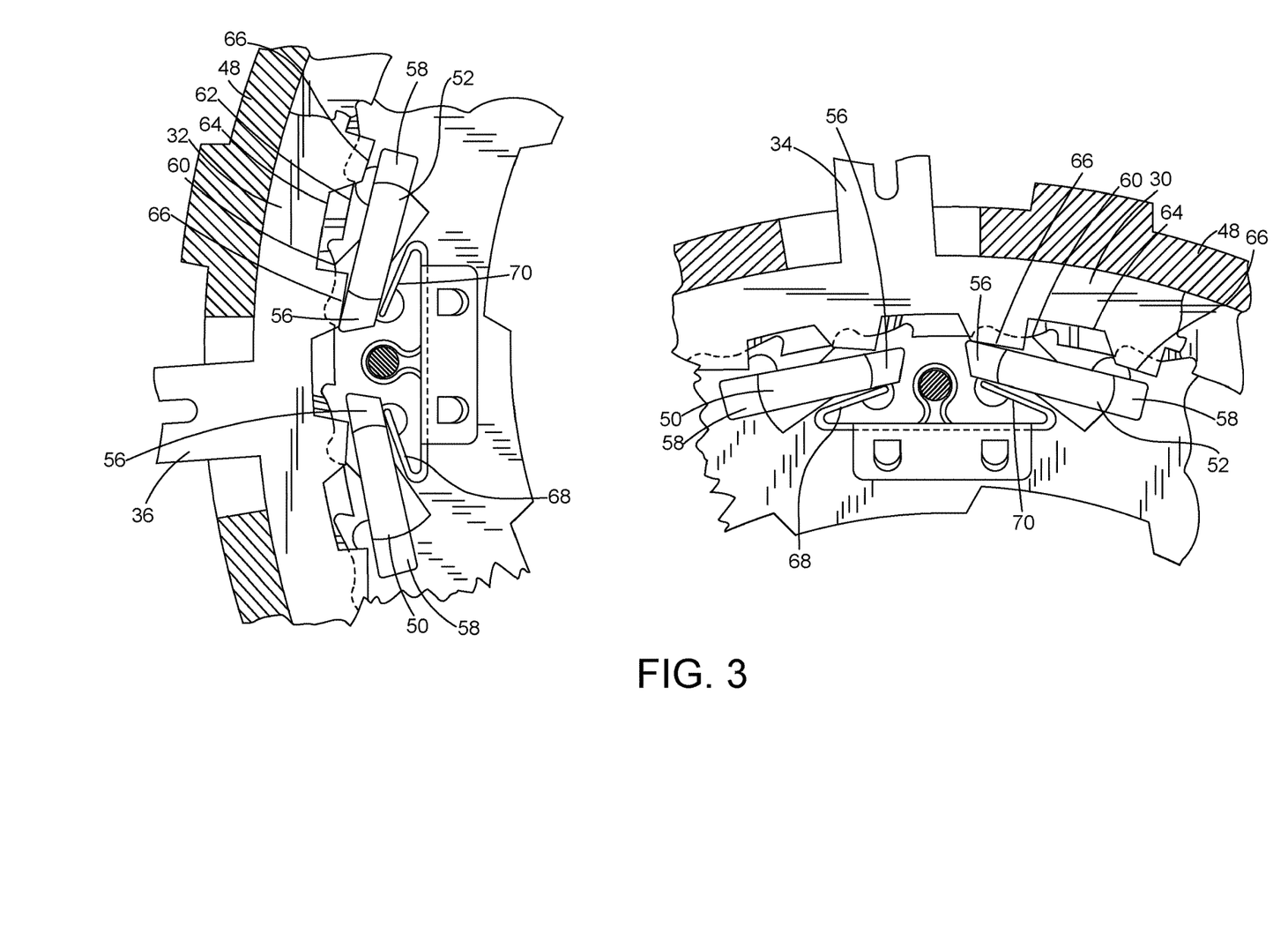
FIG. 3 is an enlarged side sectional view of a portion of another embodiment of the selectable clutch assembly of FIG. 1 constructed in accordance with the present disclosure.
Figure 4:
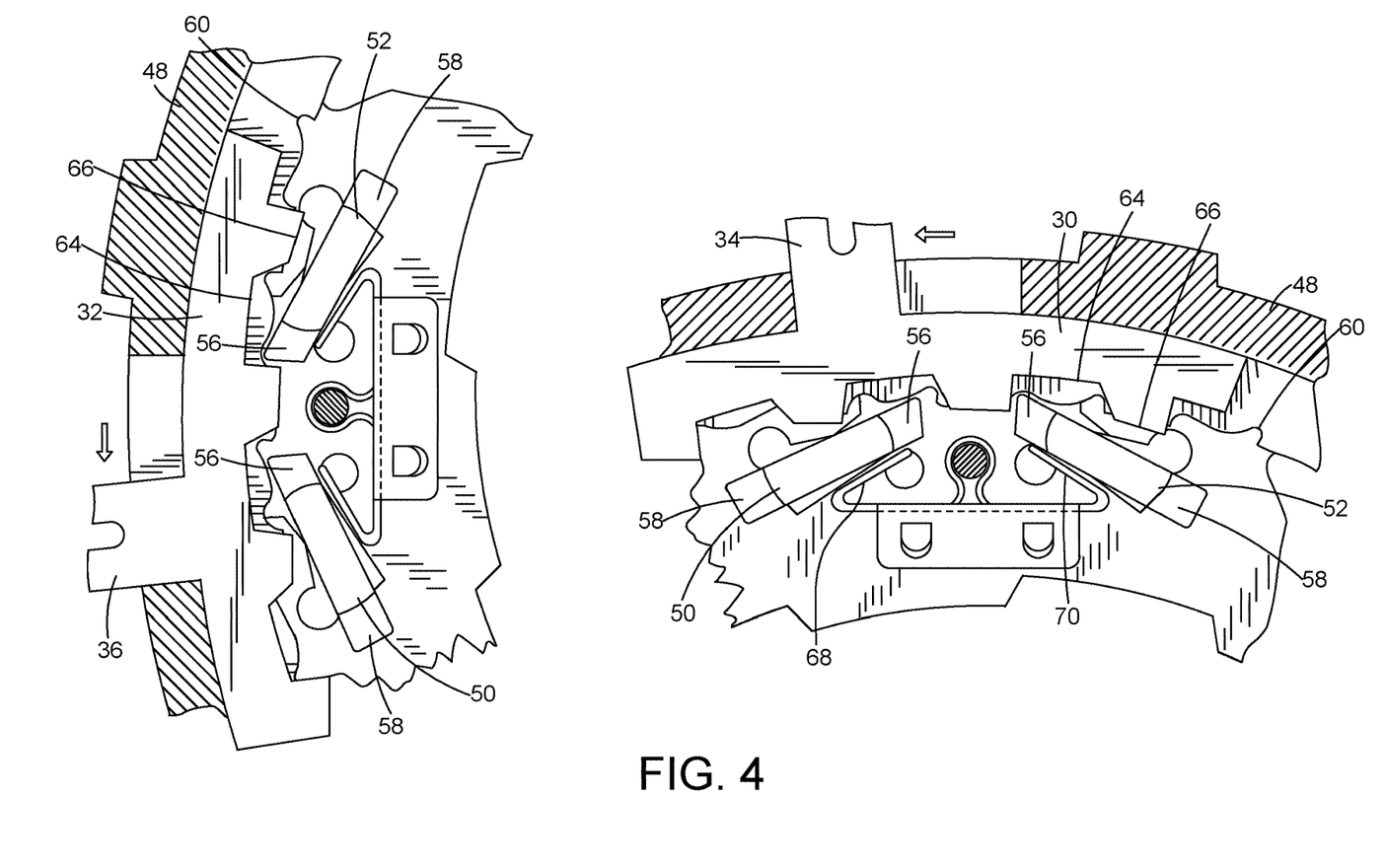
FIG. 4 is an enlarged side sectional view of a portion of another embodiment of the selectable clutch assembly of FIG. 1 constructed in accordance with the present disclosure.

A portion of the operational components of the selectable clutch module 20 are further illustrated in FIGS. 2-4 and provide non-limiting examples of the various operational modes of the selectable clutch module 20. Looking first at FIG. 2, the driven member 48, or outer race may be configured to accommodate interactions with the pawls, 50, 52 by providing the inner circumference of the driven member 48 with circumferentially spaced notches 60 each defined by and positioned between pairs of radially inwardly projecting cogs 62. The notches 60 and cogs 62 may be configured such that, in the absence of the actuator cams 30, 32, a toe portion 56 of each pawl 50, 52 may enter one of the notches 60 and is engaged by the corresponding cog 62.

Moreover, FIG. 2 shows the first cam arm 34 positioned by the first actuator 22 and the second cam arm 36 by the second actuator 26 in a first, angularly rightward, or top, selectable position, representative of a first mode of the selectable clutch module 20. In some embodiments, this position of the first and second cam arms 34, 36 may be representative of a first one-way locked, one way unlocked mode, or open mode. However, other positions and/or modes of the selectable clutch module 20 may be possible. In this configuration the slots 64 and teeth 66 of the first and second cams 30, 32 may be positioned such that the toe portions 56 of the pawls 50 may be blocked by the cam teeth 66 from engagement with the notches 54, and hence with the cogs 62 on the interior of the driven member 48. As such, the driving member 46 may be enabled to freewheel relative to the driven member 48, and to thus provide for an overrunning condition when the driving member 46 and the driven hub 42 are rotating in a clockwise direction relative to the driven member 48. Conversely, however, the position of the first and second cams 30, 32 may allow the toe portions 56 of the pawls 52 to enter the cam slots 64 due to the biasing force of the spring arm 70. Moreover, the pawls 52 may directly engage the cogs 62 of the driven member 48 to lock the driving member 46 and the driven member 48 together whenever the driving member 46 and the driven hub 42 undergo a driving, or counterclockwise rotational movement. As a result, the driven hub 42 and the outer housing (not shown) may rotate together.

FIG. 3 shows the first and second cam arms 34, 36 positioned by the actuators 22, 26 in a second, intermediate selectable position, representative of a two-way unlocked or open mode of the selectable clutch module 20. In this position and/or mode, the cam slots 64 and cam teeth 66 may be positioned such that the toe portions 56 of both pawls 50, 52 are blocked by the cam slots 64. As a result, the pawls 50, 52 may be disengaged from the cogs 62 of the driven member 48. With the pawls 50, 52 blocked from engagement with the cogs 62, the driving member 46 and the driven hub 42 may be enabled to freewheel relative to the driven member 48 and the outer housing (not shown) during relative rotation in either the clockwise or the counterclockwise direction.

FIG. 4 illustrates the first and second cam arms 34, 36 positioned by the actuators 22, 26 in a third, angularly leftward, or bottom, selectable position, representative of a two-way locked mode of the selectable clutch module 20. In this position and/or mode, the first and second cams 30, 32 may be positioned such that the toe portions 56 of the pair of pawls 50, 52 enter the cam slots 64 under the biasing forces of the spring arms 68, 70, respectively. The pair of pawls 50, 52 may be engaged by the cogs 62 of the driven member 48, as described above, to lock the driving member 46 and the driven hub 42 to the driven member 48 and the outer housing (not shown) for rotation therewith, irrespective of the rotational direction of the driving member 46 and the driven hub 42.

Even though one specific embodiment of the selectable clutch module 20 is illustrated and described herein, those skilled in the art will understand that alternative configurations of multi-mode clutches are possible that may provide operational modes or positions as alternatives or in addition to two-way unlocked and two-way locked modes (FIGS. 3 and 4), and the one way locked, one-way unlocked mode (FIG. 2). For example, an additional one-way locked, one-way unlocked mode that may provide for an overrunning condition when the driving member 46 and the driven hub 42 are rotating counterclockwise relative to the driven member 48 and the outer housing (not shown), and to lock the driving member 46 and the driven member 48 together whenever the driving member and the driven hub 42 undergo a clockwise rotational movement so the driven hub 42 and the outer housing (not shown) rotate together.

Figure 5:
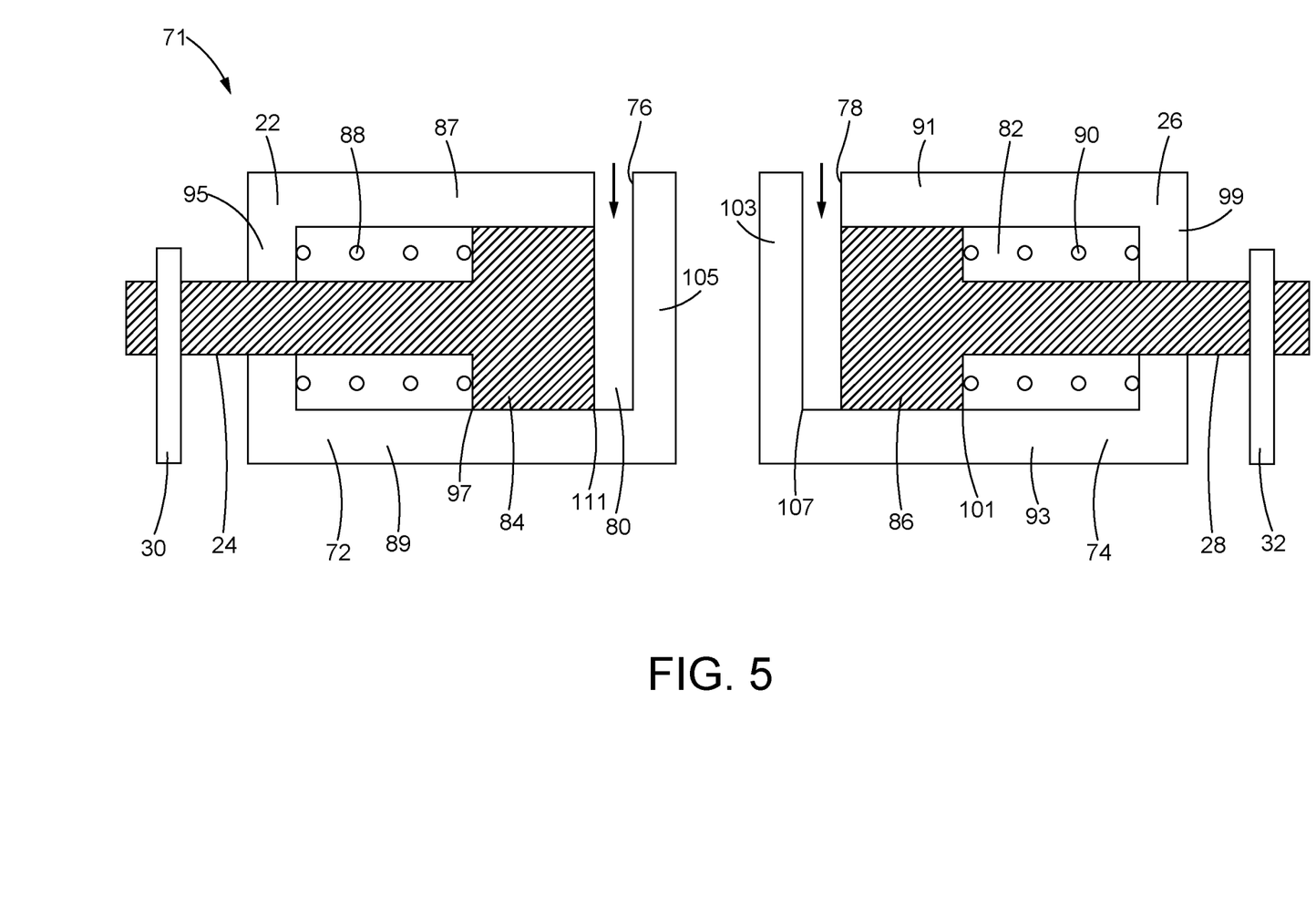
FIG. 5 is a schematic of a twin actuator mechanism of the selectable clutch constructed in accordance with the present disclosure.

FIG. 5 illustrates one non-limiting example of a twin actuating mechanism 71 composed of the first actuator 22 and the second actuator 26 illustrated in FIG. 1. In some embodiments, the twin actuating mechanism 71 may utilize two spring over hydraulic actuators, however other types of actuators may be used. Moreover, FIG. 5 shows the first and second actuators 22, 26 positioned side by side, however it will be understood the actuators 22, 26 may be arranged as needed on the selectable clutch module 20. The first and second actuators 22, 26 may include a first and second actuator housing 72, 74, respectively, which may include first and second actuator housing openings 76, 78. In some embodiments, the first and second actuator housings 72, 74 may form first and second actuator chambers 80, 82 configured to enclose first and second actuator pistons 84, 86 and first and second actuator springs 88, 90. As discussed above, the first and second actuators 22, 26 may have first and second armatures 24, 28, respectively, that are configured to impinge upon the first and second cams 30, 32 of the selectable clutch module 20. The twin actuating mechanism 71 may be configured as a twin hydraulic over spring actuator and the first and second pistons 84, 86 may selectively respond to an incoming air pressure or other such force to act upon the first and second cams 30, 32 in order to engage or disengage the pawls 50, 52 as described above.

In some embodiments, the first actuator piston 84 may be disposed within the first actuator chamber 80 and the first actuator piston 84 may be slidably engaged with a first lateral sidewall 87 and a second lateral sidewall 89 of the first actuator housing 72. Moreover, the second actuator piston 86 may be disposed within the second actuator chamber 82 and the second actuator piston 86 may be slidably engaged with a first lateral sidewall 91 and a second lateral sidewall 93 of the second actuator housing 74. Furthermore, the first actuator spring 88 may be operably coupled with the first actuator piston 84 and the first actuator spring 88 may be disposed between a first axial end 95 of the first actuator housing 72 and a first surface 97 of the first actuator piston 84. Similarly, the second actuator spring 90 may be operably coupled with the second actuator piston 86, and the second actuator spring 90 may be disposed between a first axial end 99 of the second actuator housing 74 and a first surface 101 of the second actuator piston 86.

Figure 6:
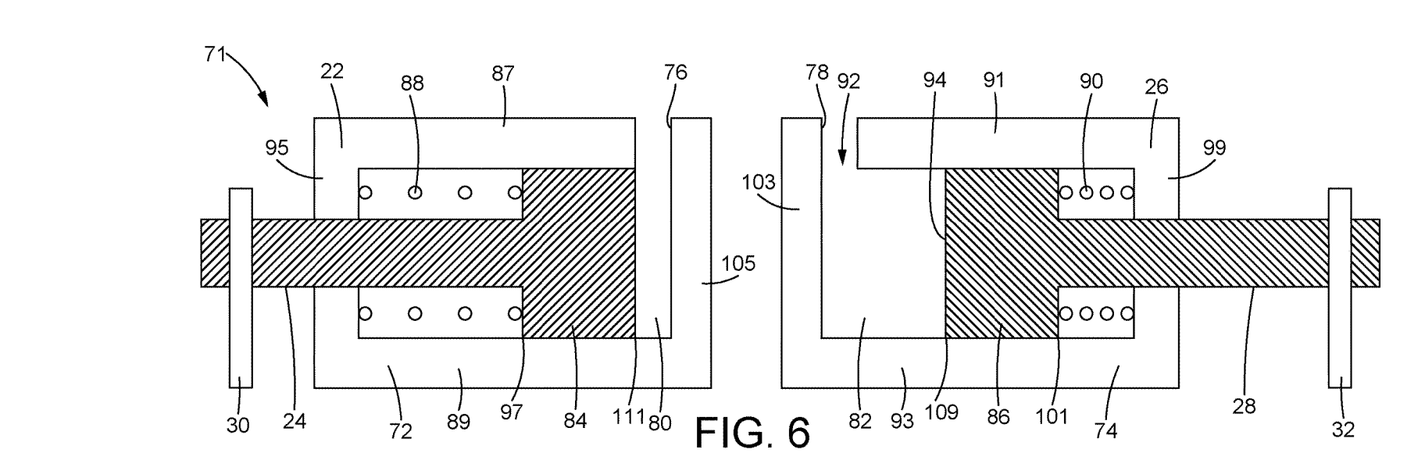
FIG. 6 is a schematic of another embodiment of the twin actuator mechanism of FIG. 5 constructed in accordance with the present disclosure.
Figure 7:
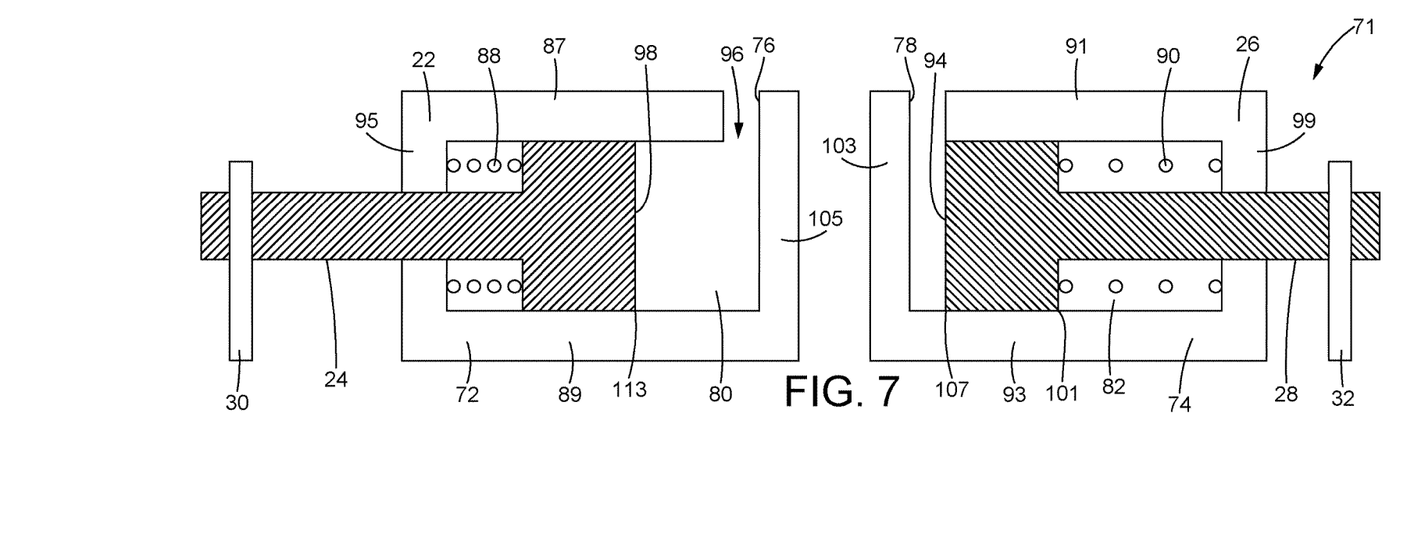
FIG. 7 is a schematic of another embodiment of the twin actuator mechanism of FIG. 5 constructed in accordance with the present disclosure.
Figure 8:
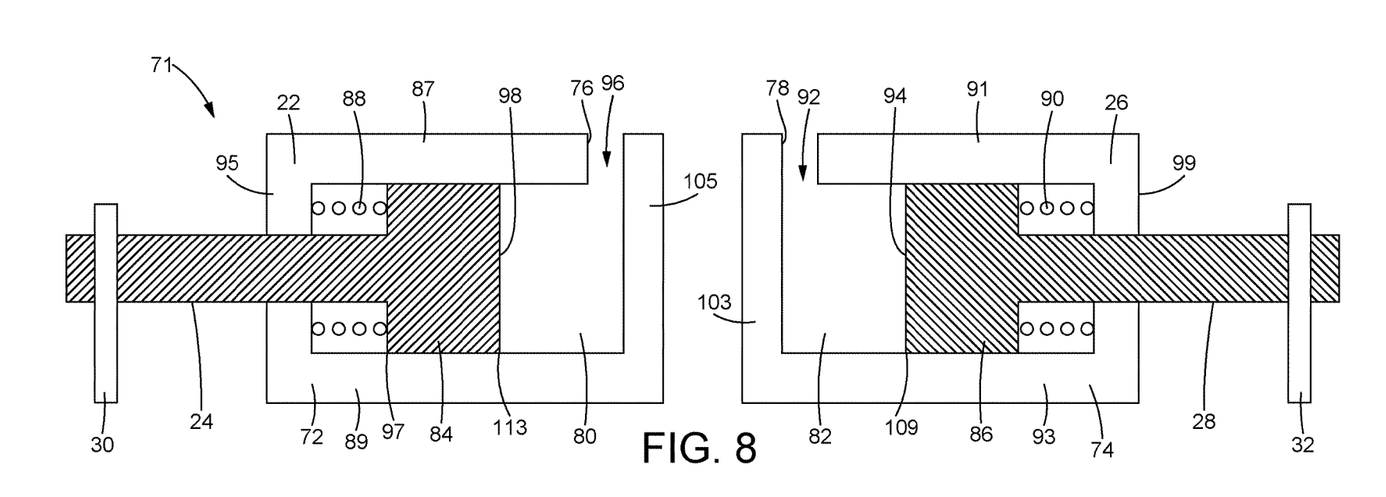
FIG. 8 is a schematic of another embodiment of the twin actuator mechanism of FIG. 5 constructed in accordance with the present disclosure.

FIGS. 6-8 illustrate non-limiting examples of the twin actuating mechanism 71 that may correspond to one or more operating modes of the selectable clutch module 20. In some embodiments, a pressure 92, 96 may be selectively applied by a pressure source (not shown) to the first and second actuators 22, 26. The pressure 92, 96 may be a controlled pressure that is provided by a system controller mechanism (not shown) and used to actuate one, both or neither of the first and second cams 30, 32. Additionally or alternatively, the pressure 92, 96 may be an uncontrolled pressure and may be a line pressure or pressure feed from another area of the system.

More specifically, in one non-limiting example illustrated in FIG. 6, a pressure 92 is supplied to the second actuator housing opening 78 formed adjacent to a second axial end 103 of the second actuator housing 74 such that the pressure 92 may enter the second actuator chamber 82 and act upon a second piston second surface 94. In some embodiments, the pressure 92 may be larger than the spring force of the second actuator spring 90 and as a result, there may be a movement of the second actuator piston 86 from a second piston first position 107 (see FIG. 5) to a second piston second position 109 and a compression of the second actuator spring 90. The movement of the actuator piston 86 and actuator spring 90 may actuate the armature 28 away from the second actuator housing 74 and produce an actuation of the cam 32. Moreover, FIG. 7 illustrates a non-limiting example where a pressure 96 is supplied to the first actuator opening 76 formed adjacent to a second axial end 105 of the first actuator housing 72 and upon entering the first actuator chamber 80 the pressure 96 may act upon a first piston second surface 98. In some embodiments, if the pressure 96 is larger than a spring force of the first actuator spring 88 then the pressure 96 may cause a movement of the first actuator piston 84 from a first actuator piston first position 111 (see FIG. 5) to a first actuator piston second position 113 and a compression of the first actuator spring 88. As such, the armature 24 may be actuated away from the first actuator housing 72 and produce an actuation of the cam 30. Additionally, as shown in FIG. 7, the pressure 92 is removed from the second actuator opening 78, or the pressure 92 is reduced such that it is less than the spring force of the second actuator spring 90. As a result, the second actuator piston 86 may move back to the second actuator first position 107 along with the corresponding movement of the second armature 28 and/or the cam 32.

FIG. 8 demonstrates one non-limiting example where the pressure 92 is supplied to the second actuator opening 78 and the pressure 96 is supplied to the first actuator opening 76. In some embodiments, the pressures 92, 96 may be larger than the spring constants of the actuator springs 90, 88. As a result, movement of both actuator pistons 84, 86 to the first actuator piston second position 113 and second piston second position 109 may cause an actuation of the armatures 28, 24 and cams 32, 30. Additionally or alternatively, it may be said that if there is a lack of pressure 92, 96, or the pressure 92, 96 is less than the spring force of the actuator springs 88, 90, then there may be little or no movement of the pistons 86, 84 from the first actuator piston first position 111 and the second actuator piston first position 107. As a result, there may be no actuation of the actuators 22, 26, and the cams 32, 30 may be positioned in an initial location, such as the location illustrated in FIG. 5

Figure 9:
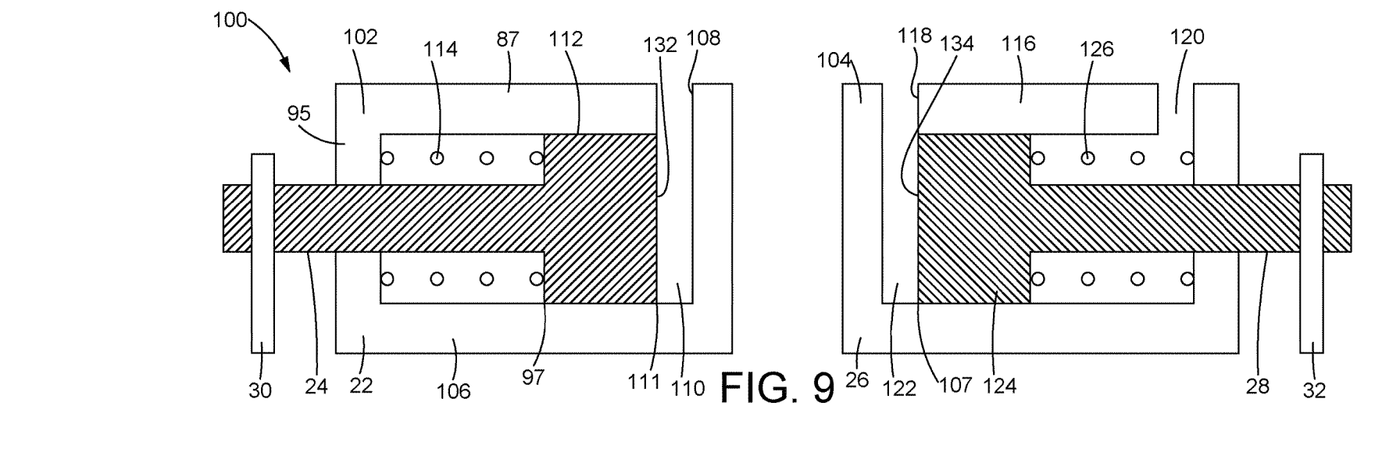
FIG. 9 is a schematic of another twin actuator mechanism of the selectable clutch constructed in accordance with the present disclosure.

In another non-limiting example a twin actuator mechanism 100 that may combine first and second actuators 22, 26 such that at least one of the actuators 22, 26 is a hydraulic over spring actuator and at least one of the actuators 22, 26 is a hydraulic over hydraulic actuator, however other types of actuators may be used. As illustrated in FIG. 9, the twin actuator mechanism 100 may be comprised of a hydraulic over spring actuator 102 and a hydraulic over hydraulic actuator 104; however other actuator configurations may be possible. Actuator 102 may have a first actuator housing 106, a first actuator housing opening 108, a first actuator chamber 110, a first actuator piston 112 and a first actuator spring 114. Moreover the hydraulic over hydraulic actuator 104 may have a second actuator housing 116, a second actuator housing first opening 118, a second actuator housing second opening 120, a second actuator chamber 122, a second actuator piston 124, and a second actuator spring 126.

FIGS. 10-13 illustrate non-limiting examples of the actuation of the twin actuator mechanism 100 that may correspond to one or more operating modes of the selectable clutch module 20. In some embodiments, the twin actuator mechanism 100 may utilize a controlled, primary pressure 128 and a secondary pressure 130. The primary pressure 128 may be controlled by a system controlling mechanism (not shown) and used to actuate one, both or neither of the first and second cams 30, 32. Furthermore, the secondary pressure 130 may be controlled or uncontrolled and may be a line pressure or pressure feed from another area of the system.

Figure 10:
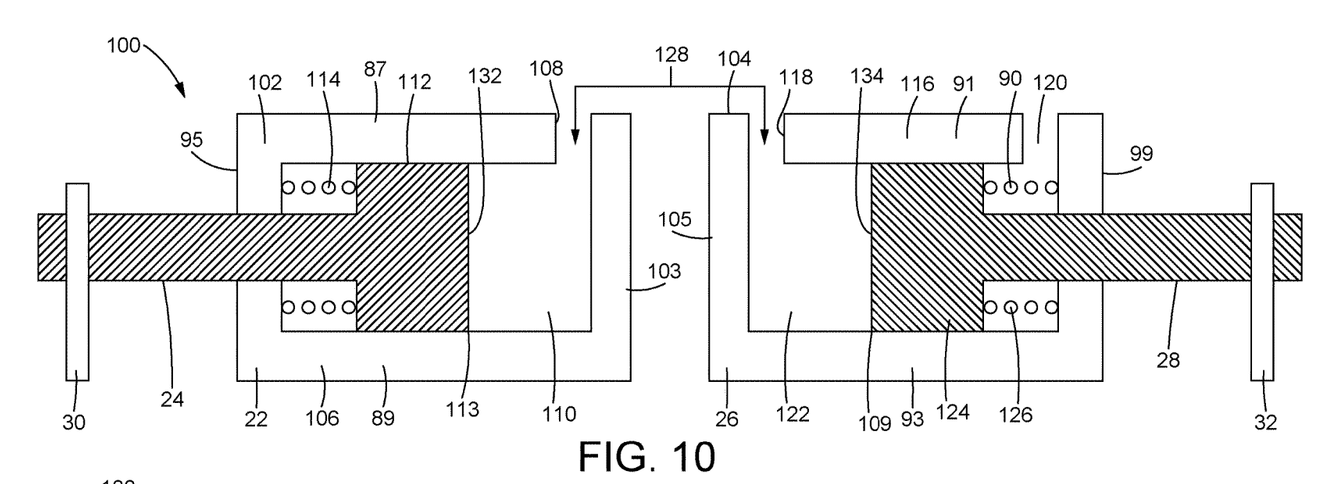
FIG. 10 is a schematic of another embodiment of the twin actuator mechanism of FIG. 9 constructed in accordance with the present disclosure.

FIG. 10 provides one non-limiting example of a first mode of operation of the selectable clutch module 20. As such, the primary pressure 128 may be supplied to the first actuator housing opening 108 and the second actuator housing first opening 118. There is no secondary pressure 130 provided. The primary pressure 128 may be directed through the housing openings 108, 118 and configured to act on a first actuator piston second surface 132 of the first actuator piston 112 and a second actuator piston second surface 134 of the second actuator piston 124. The primary pressure 128 provided may be greater than a spring force of the first actuator spring 114 and the second actuator spring 126, and as a result, there is movement of the first actuator piston 112 between the first actuator piston first position 111 and the first actuator piston second position 113, and movement of the second actuator piston 124 between the second actuator piston first position 107 and the second actuator piston second position 109. Furthermore, the movement of the first and second actuator pistons 112, 124 may cause a compression of the first and second actuator springs 114, 126, and the movement of the first and second actuator pistons 112, 124, may cause a corresponding actuation of the first and second armatures 24, 28 and/or first and second cams 30, 32.

Figure 11:
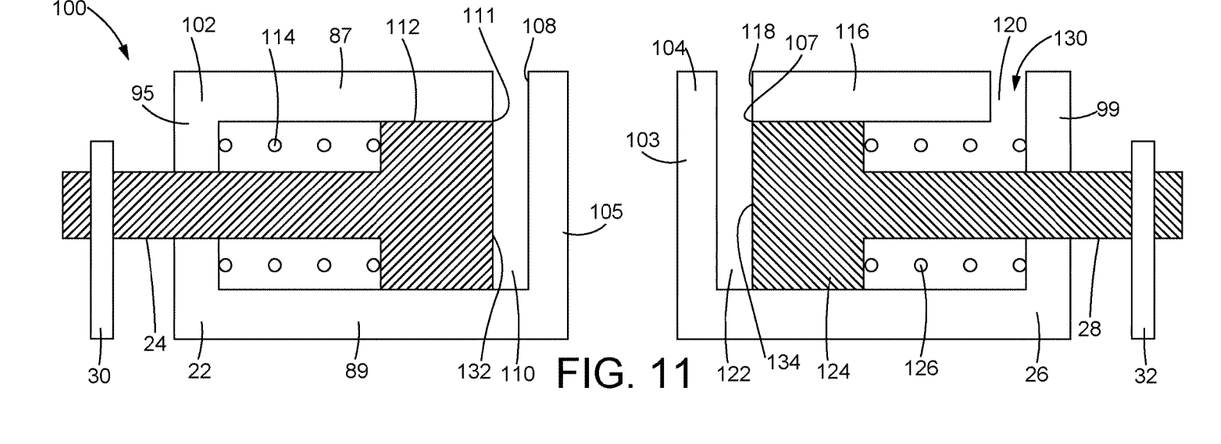
FIG. 11 is a schematic of another embodiment of the twin actuator mechanism of FIG. 9 constructed in accordance with the present disclosure.

FIG. 11 provides one non-limiting example of a second mode of operation of the selectable clutch module 20. In a second mode, the primary pressure 128 may not be supplied to the first actuator housing opening 108 or the second actuator housing first opening 118. Alternatively, the primary pressure 128 may be supplied to the first actuator housing opening 108 and the second actuator housing first opening 118 but the primary pressure 128 is less than the spring force of the first actuator spring 114 and the second actuator spring 126. Furthermore, the secondary pressure 130 may be supplied to the second actuator housing second opening 120. The secondary pressure 130 can be either a controlled pressure or a pressure utilized from outside the pressure. When only the secondary pressure 130 is supplied to the second actuator housing second opening there may be no movement of the first actuator piston 112 between the first actuator piston first position 111 and the first actuator piston second position 113 and the second actuator piston 124 between the second actuator piston first position 107 and the second actuator piston second position 109, and there is no compression of the first and second actuator springs 114, 126. As a result, there is no actuation of the first and second armatures 24, 28 and/or first and second cams 30, 32.

Figure 12:
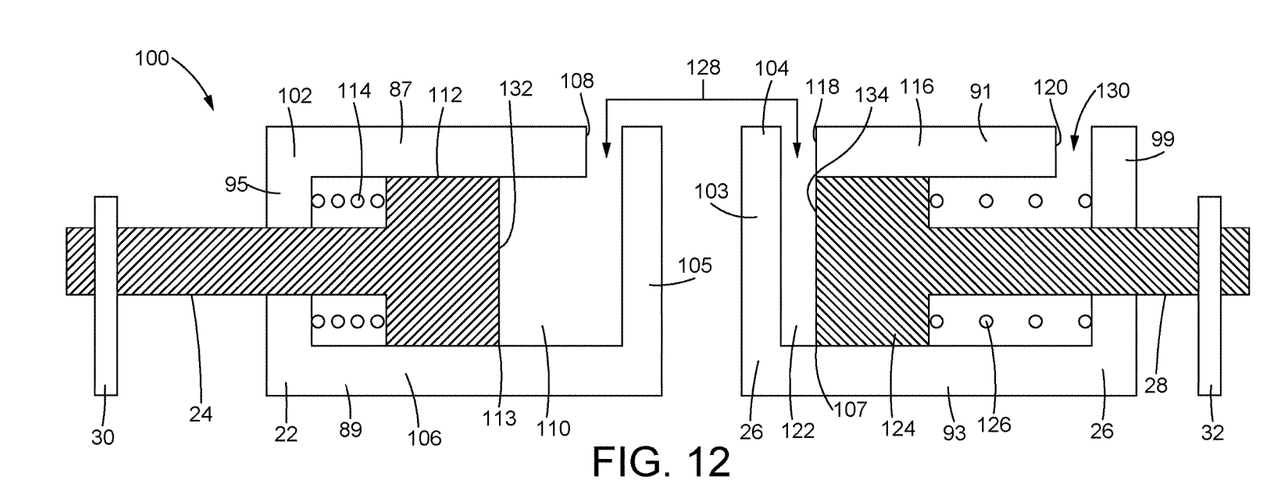
FIG. 12 is a schematic of another embodiment of the twin actuator mechanism of FIG. 9 constructed in accordance with the present disclosure.

FIG. 12 provides one non-limiting example of a third mode of operation of the selectable clutch module 20. In the exemplary third mode, the primary pressure 128 is delivered to the first actuator housing opening 108 and the second actuator housing first opening 118 and the secondary pressure 130 is supplied to the second actuator housing second opening 120. As discussed above, the primary pressure 128 may originate from a common source and branch off to be delivered to both openings 108, 118, however other configurations of the controlled pressure 128 delivery may be utilized. Furthermore, in FIG. 12 the primary pressure 128 may be less than the secondary pressure 130 plus the spring force of the second actuator spring 126. The primary pressure 128 is able to act upon first piston second surface 132 and cause a movement of the first piston 112 to the first actuator piston second position 113. However, because the secondary pressure 130 plus the spring force of the second actuator spring 126 is greater than the controlled pressure 128. The action of the controlled pressure 128 on the second piston surface 134 does not cause a movement of the second actuator piston 124. As a result, there is only movement in the first actuator piston 112, compression of the first actuator spring 114 and actuation of the first armature 24 and the first cam 30.

Figure 13:
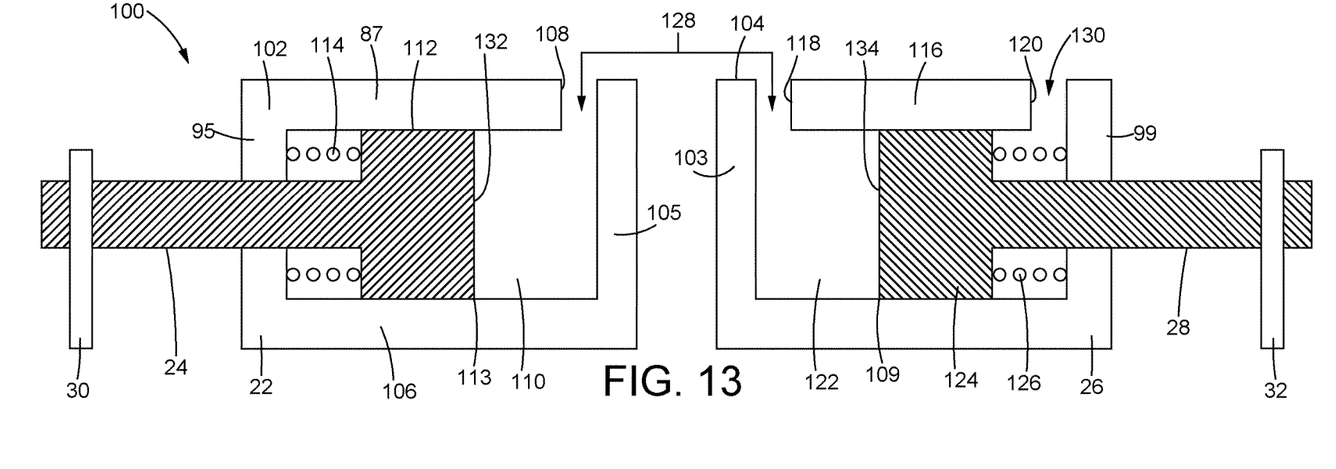
FIG. 13 is a schematic of another embodiment of the twin actuator mechanism of FIG. 9 constructed in accordance with the present disclosure.

FIG. 13 provides one non-limiting example of a fourth mode of operation of the selectable clutch module 20. In the exemplary fourth mode, the primary pressure 128 is delivered to the first actuator housing opening 108 and the second actuator housing first opening 118 and the secondary pressure 130 is supplied to the second actuator housing second opening 120. The primary pressure 128 may originate from a common source and branch off to be delivered to both openings 108, 118, however other configurations of the primary pressure 128 delivery may be utilized. In FIG. 13, the primary pressure 128 may be greater than both the spring constant of the first actuator spring 114 and the spring constant of the second actuator spring 126 plus the secondary pressure 130. Therefore, the primary pressure 128 acting on the first piston second surface 132 and the second piston second surface 134 may cause a movement of both the first actuator piston 112 to the first actuator piston second position 113 and the second actuator piston 124 to the second actuator piston second position 109. Moreover, movements by the first and second actuator pistons 112, 124 may actuate first and second armatures 24, 28 and/or first and second cams 30, 32.

It is to be understood that the foregoing is a description of one or more embodiments of the invention. However, the invention is not limited to the particular embodiment(s) disclosed herein. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

INDUSTRIAL APPLICABILITY

In general, the selectable clutch of the present disclosure may be applied in a variety of industrial applications, including but not limited to, automobiles, trucks, vans, off-road vehicles, agriculture equipment, construction equipment, and other equipment of the type incorporating internal combustion engines, automatic transmissions, and drivelines.

As disclosed herein, the selectable clutch module may incorporate a plurality of actuators that can be used to selectively actuate the selectable clutch module in three or more modes. Furthermore, the selectable clutch module may be adaptable to allow use with both new transmission applications as well as with an existing transmission architecture where there may be only one controlled pressure feed. Additionally or alternatively, the selectable clutch module of the present disclosure may allow for independent control of the forward and reverse acting cams. In some embodiments, the use of actuators such as hydraulic over spring actuators, hydraulic over hydraulic actuators and/or other known actuators may allow for hydraulic actuation in both directions. As a result, this may allow for faster response time due to the possibility of increasing the pressure at any point and therefore increasing the force. This may provide improvements over actuators that have a piston which relies on a return spring because the return spring lacks the ability to increase its force on demand. Furthermore, such actuators require the return spring to be sized for its specific application in order to both balance the actuation response and the return response.

What is claimed is:

1. A twin actuating mechanism for a selectable clutch having a plurality of operational modes, wherein the selectable clutch includes a first cam having a first cam profile and a second cam having a second cam profile, the first cam actuated by the first actuator and the second cam actuated by the second actuator;

the selectable clutch further including a first cam arm attached to the first cam and a second cam arm attached to the second cam, wherein the first cam arm is operatively associated with the first actuator and the second cam arm is operatively associated with the second actuator; and at least one pair of opposing pawls, wherein the at least one pair of opposing pawls is able to rotate in accordance with a position of the first cam profile and the second cam profile, and the first actuator and the second actuator are configured to selectively actuate the first and second cams between the plurality of operational modes of the selectable clutch;

the twin actuating mechanism comprising:

a first actuator including a first actuator housing and a first actuator piston disposed within the first actuator housing;

a second actuator including a second actuator housing and a second actuator piston disposed within the second actuator housing;

a first actuator chamber defined by the first actuator housing and the first actuator piston disposed within the first actuator chamber, the first actuator piston slidably engaged with a first lateral sidewall and a second lateral sidewall of the first actuator housing such that the first actuator piston is configured to move along the first and second lateral sidewalls between at least a first actuator piston first position and a first actuator piston second position;

a second actuator chamber defined by the second actuator housing and the second actuator piston disposed within the second actuator chamber, the second actuator piston slidably engaged with a first lateral sidewall and a second lateral sidewall of the second actuator housing such that the second actuator piston is configured to move along the first and second lateral sidewalls between at least a second actuator piston first position and a second actuator piston second position;

a first actuator spring operably coupled with the first actuator piston, the first actuator spring disposed between a first actuator housing first axial end and a first actuator piston first surface;

a second actuator spring operably coupled with the second actuator piston, the first actuator spring disposed between a second actuator housing first axial end and a second actuator piston first surface;

a first armature fixedly attached to the first actuator piston first surface such that the first armature is configured to respond to a movement of the first actuator piston;

a second armature fixedly attached to the second actuator piston first surface such that the second armature is configured to respond to a movement of the second actuator piston;

a first actuator housing opening extending from a first actuator housing exterior surface into the first actuator chamber, the first actuator housing opening positioned adjacent to a first actuator housing second axial end, and the first actuator housing opening configured to fluidly connect a pressure source with the first actuator chamber;

a second actuator housing first opening extending from a second actuator housing exterior surface into the second actuator chamber, the second actuator housing first opening positioned adjacent to a second actuator housing second axial end, and the second actuator housing first opening configured to fluidly connect the pressure source with the second actuator chamber;

a second actuator housing second opening extending from the second actuator housing exterior surface into the second actuator chamber, the second actuator housing second opening positioned adjacent to the second actuator housing first axial end, and the second actuator housing second opening configured to fluidly connect the pressure source with the second actuator piston first surface; and wherein a pressure is selectively supplied by the pressure source to at least one of the first actuator opening, the second actuator first opening and the second actuator second opening, and the pressure configured to act upon at least one of the first actuator piston and the second actuator piston to relatively displace the first and second cams to actuate the selectable clutch between the plurality of operational modes.

2. The twin actuating mechanism of claim 1, wherein the first actuator spring produces a first spring force biasing the first actuator piston towards the second axial end of the first actuator housing and the second actuator spring produces a second spring force biasing the second actuator piston towards the second axial end of the second actuator housing, and wherein the pressure supplied by the pressure source to at least one of the first actuator opening and the second actuator second opening is less than the first spring force and the second spring force such that the first actuator piston is maintained in the first actuator piston first position and the second actuator piston is maintained in the second actuator piston first position.

3. The twin actuating mechanism of claim 1, wherein the pressure supplied is greater than at least one of the first spring force and the second spring force and, the pressure is configured to act on at least one of a first actuator piston second surface and a second actuator piston second surface to compress at least one of the first spring and the second spring such that at least one of the first actuator piston and the second actuator piston moves to the first actuator piston second position and the second actuator piston second position.

4. The twin actuating mechanism of claim 2, wherein the first actuator and the second actuator are both configured as a spring over hydraulic actuator.

5. The twin actuating mechanism of claim 1, wherein the pressure supplied by the pressure source includes a primary pressure selectively supplied to at least one of the first actuator housing opening and the second actuator housing first opening and a secondary pressure selectively supplied to the second actuator second opening, and wherein the primary pressure is configured to act upon at least one of the first actuator piston second surface and the second actuator piston second surface and the secondary pressure is configured to act upon the second actuator piston first surface to actuate the selectable clutch between the plurality of operational modes.

6. The twin actuating mechanism of claim 5, wherein the first actuator spring produces a first spring force biasing the first piston towards the first actuator housing second axial end and the second actuator spring produces a second spring force, a sum of the second spring force and the secondary pressure biasing the second piston towards the second actuator housing second axial end, and wherein the primary pressure is less than the first spring force and the primary pressure is less than the sum of the second spring force and the secondary pressure, such that the first actuator piston is maintained in the first actuator piston first position and the second actuator piston is maintained in the second actuator piston first position.

7. The twin actuating mechanism of claim 6, wherein the primary pressure is supplied to both the first actuator housing opening and the second actuator housing first opening, the primary pressure is greater than the first spring force and the primary pressure is greater than the sum of the second spring force and the secondary pressure such that the first actuator piston moves from the first actuator piston first position to the first actuator piston second position and the second actuator piston moves from the second actuator piston first position to the second actuator piston second position.

8. The twin actuating mechanism of claim 6, wherein the primary pressure is supplied to both the first actuator housing opening and the second actuator housing first opening, the primary pressure is greater than the first spring force and the primary pressure is less than the sum of the second spring force and the secondary pressure such that the first actuator piston moves from the first actuator piston first position to the first actuator second position and the second actuator piston is maintained in the second actuator piston first position.

9. The twin actuating mechanism of claim 5, wherein the first actuator is configured as a spring over hydraulic actuator and the second actuator is configured as a hydraulic over hydraulic actuator.

10. A selectable clutch having a plurality of operational modes, the selectable clutch comprising:
a twin actuating mechanism configured to selectably actuate the selectable clutch between the plurality of operational modes, the twin actuating mechanism comprising:
a first actuator including a first actuator housing and a first actuator piston and a second actuator having a second actuator housing and a second actuator piston, the first actuator and the second actuator fluidly coupled to a pressure source, the pressure source configured to selectably supply a pressure to actuate the first actuator and the second actuator,
a first actuator chamber defined by the first actuator housing and the first actuator piston disposed within the first actuator chamber,
a second actuator chamber defined by the second actuator housing and the second actuator piston disposed within the second actuator chamber,
a first actuator housing opening extending from a first actuator housing exterior surface into the first actuator chamber, the first actuator housing opening positioned adjacent to a first actuator housing axial end, and the first actuator housing opening configured to fluidly connect the pressure source with the first actuator chamber,
a second actuator housing first opening extending from a second actuator housing exterior surface into the second actuator chamber, the second actuator housing first opening positioned adjacent to a second actuator housing second axial end, and the second actuator housing first opening configured to fluidly connect the pressure source with the second actuator chamber, and
a second actuator housing second opening extending from the second actuator housing exterior surface into the second actuator chamber, the second actuator housing second opening positioned adjacent to the second actuator housing first axial end, and the second actuator housing second opening configured to fluidly connect the pressure source with the second actuator piston first surface,
a first cam having a first cam profile and a second cam having a second cam profile, the first cam being actuated by the first actuator and the second cam being actuated by the second actuator;
a first cam arm attached to the first cam and a second cam arm attached to the second cam, wherein the first cam arm is operatively associated with the first actuator and the second cam arm is operatively associated with the second actuator; and
at least one pair of opposing pawls, wherein the at least one pair of opposing pawls being able to rotate according to a position of the first cam profile and the second cam profile, and the first actuator and the second actuator being configured to selectively actuate the first and second cams between the plurality of operational modes of the selectable clutch.

11. The selectable clutch of claim 10, wherein the pressure supplied to actuate the first actuator and the second actuator includes a primary pressure and a secondary pressure, the primary pressure is selectively supplied to at least one of the first actuator housing opening and the second actuator housing first opening, the secondary pressure is selectively supplied to the second actuator second opening, and wherein the primary pressure is configured to act upon at least one of the first actuator piston second surface and the second actuator piston second surface and the secondary pressure is configured to act upon the second actuator piston first surface to actuate the first and second cams.

12. The selectable clutch of claim 11, wherein the first actuator further includes a first spring producing a first spring force and the second actuator further includes a second spring producing a second spring force, and wherein the primary pressure is less than both the first spring force and the second spring force such that the first actuator piston is maintained in a first actuator piston first position and the second actuator piston is maintained in a second actuator piston first position, and wherein the first actuator piston first position and the second actuator piston first position, respectively actuate the first and second cams according to a first operational mode of the selectable clutch.

13. The selectable clutch of claim 12, wherein the primary pressure supplied is greater than the first spring force and the pressure is less than the second spring force such that he first actuator piston is moved from the first actuator piston first position to a first actuator piston second position and the second actuator piston is maintained in the second actuator piston first position, and wherein the first actuator piston second position and the second actuator piston first position, respectively actuate the first and second cams according to a second operational mode of the selectable clutch.

14. The selectable clutch of claim 12, wherein the primary pressure supplied is greater than both the first spring force and the second spring force such that the first actuator piston is moved from the first actuator piston first position to a first actuator piston second position and the second actuator piston is moved from the second actuator piston first position to a second actuator piston second position, and wherein the first actuator piston second position and the second actuator piston second position, respectively actuate the first and second cams according to a third operational mode of the selectable clutch.

15. The selectable clutch of claim 10, wherein the first actuator and the second actuator are both configured as hydraulic over spring actuators.

* * * * *